US006806893B1

(12) United States Patent
Kolawa et al.

(10) Patent No.: US 6,806,893 B1
(45) Date of Patent: Oct. 19, 2004

(54) SYSTEM AND METHOD FOR DISPLAYING SIMULATED THREE DIMENSIONAL BUTTONS IN A GRAPHICAL USER INTERFACE

(75) Inventors: Adam K. Kolawa, Bradbury, CA (US); Wendell T. Hicken, Whittier, CA (US); Marek Kucharski, Krakow (PL); Janusz Haka, Monrovia, CA (US)

(73) Assignee: Parasoft Corporation, Monrovia, CA (US)

( * ) Notice: Subject to any disclaimer, the term of this patent is extended or adjusted under 35 U.S.C. 154(b) by 900 days.

(21) Appl. No.: 09/128,706

(22) Filed: Aug. 4, 1998

Related U.S. Application Data (60) Provisional application No. 60/054,522, filed on Aug. 4, 1997.

(51) Int. Cl.[7] .................................................. G09G 5/00
(52) U.S. Cl. ..................... 345/848; 345/836; 345/840; 345/852
(58) Field of Search .............................. 345/348, 349, 345/350, 351, 352, 354, 355, 976, 334

(56) References Cited

U.S. PATENT DOCUMENTS

| | | | | |
|---|---|---|---|---|
| 5,666,504 A | * | 9/1997 | Crutcher | 345/355 |
| 5,859,642 A | * | 1/1999 | Jones | 345/352 |
| 5,903,265 A | * | 5/1999 | Bogdan | 345/334 |

* cited by examiner

*Primary Examiner*—John Cabeca
*Assistant Examiner*—Tadesse Hailu
(74) *Attorney, Agent, or Firm*—Christie, Parker & Hale, LLP (57) ABSTRACT

User input buttons are displayed as part of a graphical user interface by showing the buttons as multiple oval shapes and including shading and highlighting to indicate different states of the buttons. The buttons appear to the user as three dimensional simulated mechanical buttons because of the shape, shading, and temporal states used to represent them. States of the buttons include inactive, active, entered and pressed, each state having its own bitmap image to represent it on the computer display.

14 Claims, 7 Drawing Sheets

Microfiche Appendix Included
(2 Microfiche, 34 Pages)

SYSTEM AND METHOD FOR DISPLAYING SIMULATED THREE DIMENSIONAL BUTTONS IN A GRAPHICAL USER INTERFACE

This application claims the benefit of Provisional application Ser. No. 60/054,522 Aug. 4, 1997.

A portion of the disclosure of this patent document contains material which is subject to copyright protection. The copyright owner has no objection to the facsimile reproduction by anyone of the patent disclosure, as it appears in the Patent and Trademark office patent files or records, but otherwise reserves all copyright rights whatsoever.

REFERENCE TO A MICROFICHE APPENDIX

A source code listing of a computer program for practicing the invention is submitted as a microfiche appendix consisting of 34 frames (2 identical microfiche copies are submitted).

FIELD OF THE INVENTION

This invention relates generally to graphical user interfaces of computer systems and more specifically to a method for displaying a series of three dimensional appearing button images in response to user inputs.

CROSS REFERENCE TO RELATED APPLICATIONS

This application claims priority of provisional application Ser. No. 60/054,522, filed on Aug. 4, 1997, the disclosure of which is herein incorporated by reference.

This application is also related to a design patent application entitled Three Dimensional Appearing Computer Generated Input Icon For A Graphical User Interface, Ser. No. 29/073,892, filed on Jun. 26, 1997, now pending.

BACKGROUND OF THE INVENTION

On-screen input buttons selectable by a user through use of a cursor and a mouse have long been a staple of graphical user interfaces for personal computers. Typically, the user moves the mouse and a corresponding cursor is moved on the computer monitor's display. When a user desires to instruct the application program being executed by the computer to execute a function, the user positions the cursor over a user input button and depresses a button on the mouse. The computer detects the depression of the button, determines the present location of the cursor on the display, and notifies the application program of the input event and the location of the cursor at the time of the push of the button. The application program then determines what action to take in response to the input event. The application program may decide to accept the user input as a logical depression of the selected button and update the display accordingly. The display of the user input button is usually changed in some way to indicate to the user that the input selection has been accepted and processed by the program.

Although widely used, this approach exhibits several deficiencies. When a user moves the cursor near a selected button, the user is not sure when the cursor is actually within the confines of the button. When the on-screen user input button is depressed (that is, "activated"), the display of the depressed button is often difficult to distinguish from the display of the undepressed button, leading to confusion on the part of the user. Additionally, most user input buttons are represented as squares or rectangles, which are hard to represent on the display in a depressed state in a manner which is easy to recognize and aesthetically pleasing to the user.

SUMMARY OF THE INVENTION

An embodiment of the present invention provides a system and method for displaying on a screen of a computer monitor an oval shaped user input button as part of a graphical user interface in such a way that the button is aesthetically pleasing to the user because it appears to be three dimensional. The button is initially displayed in an inactive state to suggest to the user that the button is not currently available for selection. The button is displayed in an active state when the application program will accept user input from the button. The button is displayed in an entered state when the button is being selected by the user. Finally, the button is displayed in a pressed state when the user actually selects via the input device the command or function represented by the button. In all of these states, the button appears to be three dimensional to the user through the use of perspective views of oval buttons, a simulated light source, and shading.

A system for simulating push button operation on the screen of a display device includes means for displaying on the screen a first oval and second oval spaced below the first oval a first predetermined distance to simulate an undepressed three dimensional mechanical push button, an input device for selecting the simulated push button, and means responsive to the input device for displaying on the display the first oval and the second oval spaced below the first oval a second predetermined distance shorter than the first distance to simulate a depressed three dimensional mechanical push button when a user input is received from the input device.

The method of displaying a simulated three dimensional mechanical button in a graphical user interface includes the steps of displaying on the screen a first oval and second oval spaced below the first oval a first predetermined distance to simulate an undepressed three dimensional mechanical push button, selecting the simulated push button, and displaying on the display the first oval and the second oval spaced below the first oval a second predetermined distance shorter than the first distance to simulate a depressed three dimensional mechanical push button when a user input is received from the input device.

Still other objects and advantages of the present invention will become readily apparent to those skilled in the art from the following detailed description, wherein is shown and described only the preferred embodiment of the invention, simply by way of illustration of the best mode contemplated for carrying out the invention. As will be realized, the invention is capable of other and different embodiments, and its several details are capable of modifications in various obvious respects, all without departing from the invention. Accordingly, the drawings and description are to be regarded as illustrative in nature, and are not restrictive.

DETAILED DESCRIPTION OF THE INVENTION

In an embodiment of the present invention, the simulated three dimensional oval user input buttons are implemented as part of a graphical user interface using event driven programming techniques written in the C++ programming language. The source code for this implementation is made a part of the application in microfiche form, but one skilled in the art could implement the present invention using one of several well known programming languages. In other embodiments, the shape of the user input buttons may be changed according to user preference.

Figure 1:
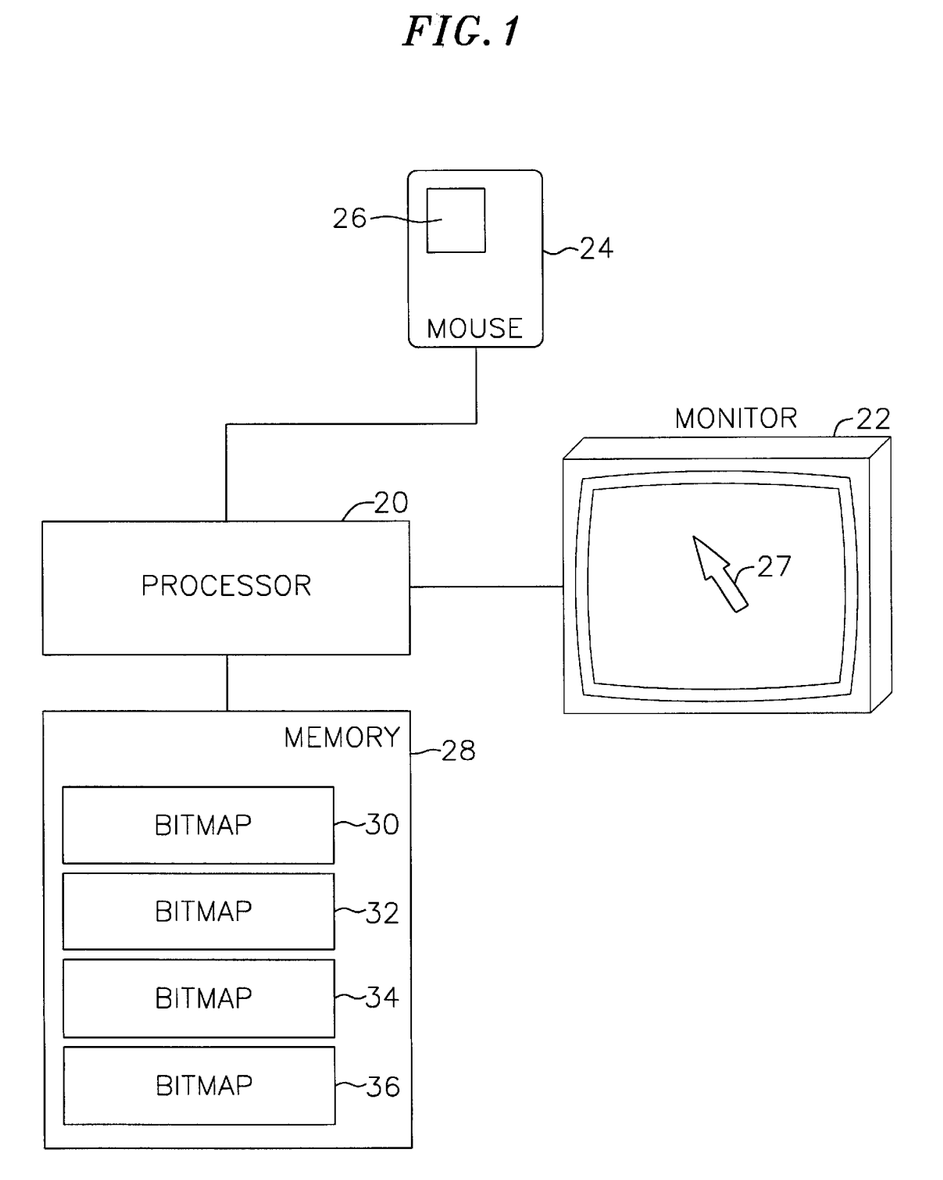
FIG. 1 is a diagram of the computer system according to an embodiment of the present invention.

FIG. 1 is a diagram of the computer system according to the present invention. A processor 20 is coupled to a computer monitor 22 for displaying data to a user (not shown). The processor accepts input data from a user input device 24. In one embodiment of the invention, the user input device 24 is a mouse. In alternative embodiments, the input device 24 may be a lightpen, a keyboard, or any other type of commercially available input device known in the art.

The mouse in the described embodiment has at least one button 26 for receiving a user action or selection. The mouse controls a movable "pointer" 27 (also referred to as a cursor) displayed on the computer monitor 22. The processor 20 is also coupled to a memory 28, which stores a plurality of bitmap image files. These bitmap image files are shown in FIG. 1 as bitmap 1 30, bitmap 2 32, bitmap 3 34, and bitmap 4 36. The bitmap image files store the image data used to display the various states of the user input buttons.

Initially, the user input button is represented by displaying, by conventional methods, a first bitmap image at a selected location on the computer display. Bitmap image 1 30, retrieved from memory 28, contains an image of a user input button in an "inactive" state. In the described embodiment, this image represents the user input button as mostly grey in color, signifying to the user that the user input button cannot be selected. The bitmap image is stored in a file in memory 28 of the computer system.

Figure 2:
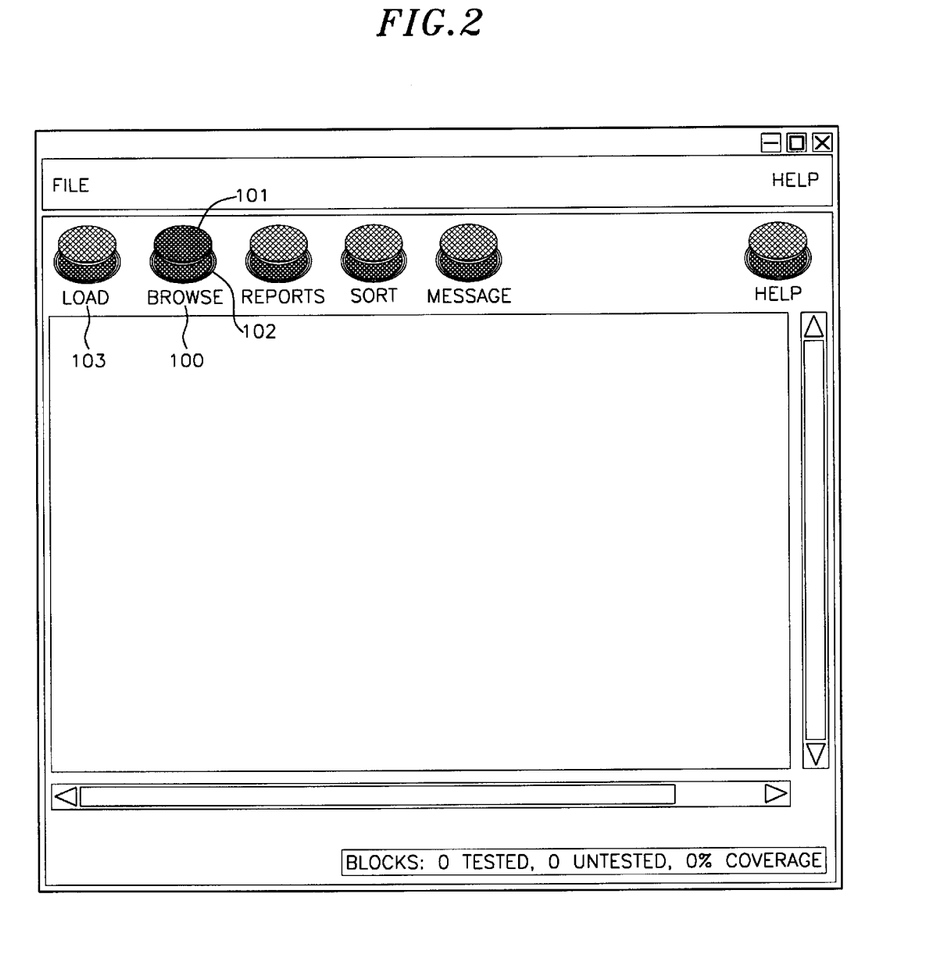
FIG. 2 is an example display showing the active and inactive states according to an embodiment of the present invention.

FIG. 2 shows six user input buttons, all of which are operable in accordance with the present invention. The "browse" button 100 in FIG. 2 is depicted as first 101 and second 102 ovals that are shaded to indicate the inactive state of the button. In alternative embodiments, other methods may be employed to depict the inactive state. For instance, the button may be overlaid with an "X" to depict its inaccessibility. Other such methods will become apparent to those skilled in the art upon examination of the features of the invention, or may be learned by practice of the invention.

A function designating symbol, such as an icon, may also be placed on the top of the first oval of the user input button to signal to the user what the intended purpose or function of the button is in the application program being executed. This icon may include user-recognizable symbols. The oval shape of the user input button conveys the visual impression of (i.e., it simulates) an actual three dimensional mechanical push button that is being seen by the user from an angle. Shading is used to represent a light source that also enhances the three dimensional appearance of the button to the user.

When the application program determines that the user input button should be displayed in an "active" state, e.g., due to internal processing within the application program occurring in response to other user inputs, a bitmap image 2 32 is retrieved from a file in memory 28 and displayed at a selected location of the display. An example of an application program-directed change from the inactive to the active state for user input buttons is when a set of functions represented by buttons is available only in a certain operating mode of the program, which has just been entered. For example, the "load" button 103 in FIG. 2 is detectable as being in the active state by the appearance of the button in a lighter shade than the inactive "browse" button 100. This "load" function is currently available for use by the user in interacting with the application program.

In the described embodiment, an active user input button transitions to an "entered" state when the user moves the cursor by means of the computer system's mouse to a position on the display which is within the confines of such button. The button is then highlighted to represent that it is now in the entered state. To represent a highlighted button, a bitmap image 3 34 is retrieved from a file in memory 28 and displayed at the proper position on the display, overwriting the previously displayed active state image.

Alternative methods to depict the entered state will become apparent to those skilled in the art. For instance, instead of highlighting the entire button, a box displayed next to the button may be marked with a check mark to indicate the entered state. Certain keys on the keyboard corresponding to a particular button may be also be lit to depict the entered state of the selected button.

In the described embodiment, a user input button in the enter state caused by the positioning of a cursor over the button transitions to a "pressed" state if the user depresses one or more buttons on the mouse, thereby selecting the operation of the program depicted by the button. In this case, notification of the interrupt caused by the depression of the mouse button is sent to the application program to communicate that a particular selection has been made. The application program retrieves bitmap image 4 36 from a file in memory 28 to represent the pressed state of the user input button. This fourth bitmap image is then displayed on the display, overwriting the entered state image.

Figure 3:
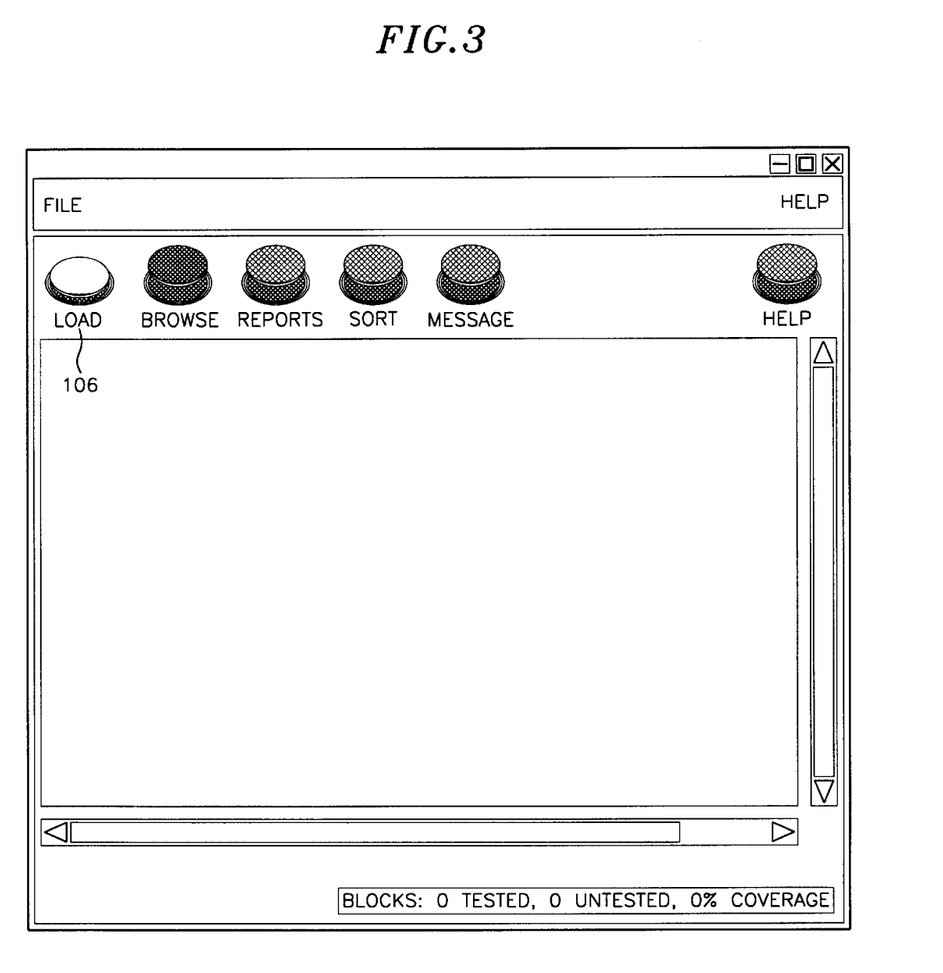
FIG. 3 is an example display showing the pressed state according to an embodiment of the present invention.

FIG. 3 is an example display showing the pressed state according to the present invention. For example, the "load" button 106 is now shown in a highlighted and depressed manner, thereby indicating to the user that the user input button has been successfully pushed. The shading below the oval button is decreased to convey the visual impression of an actual three dimensional push button which has been pressed. In the described embodiment, moving the cursor away from the button which is in the pressed state, without first depressing the button, will not change the state of the button (i.e. the button remains pressed and highlighted regardless of the cursor position).

If the user later positions the cursor of the mouse back over pressed user input button and depresses the mouse's button, the application program transitions the user input button back to the entered state, and then to the active state as the user moves the cursor away from the button. The third and second bitmap images (for the entered and active states respectively) are then redisplayed accordingly in the appropriate place on the display.

Figure 4:
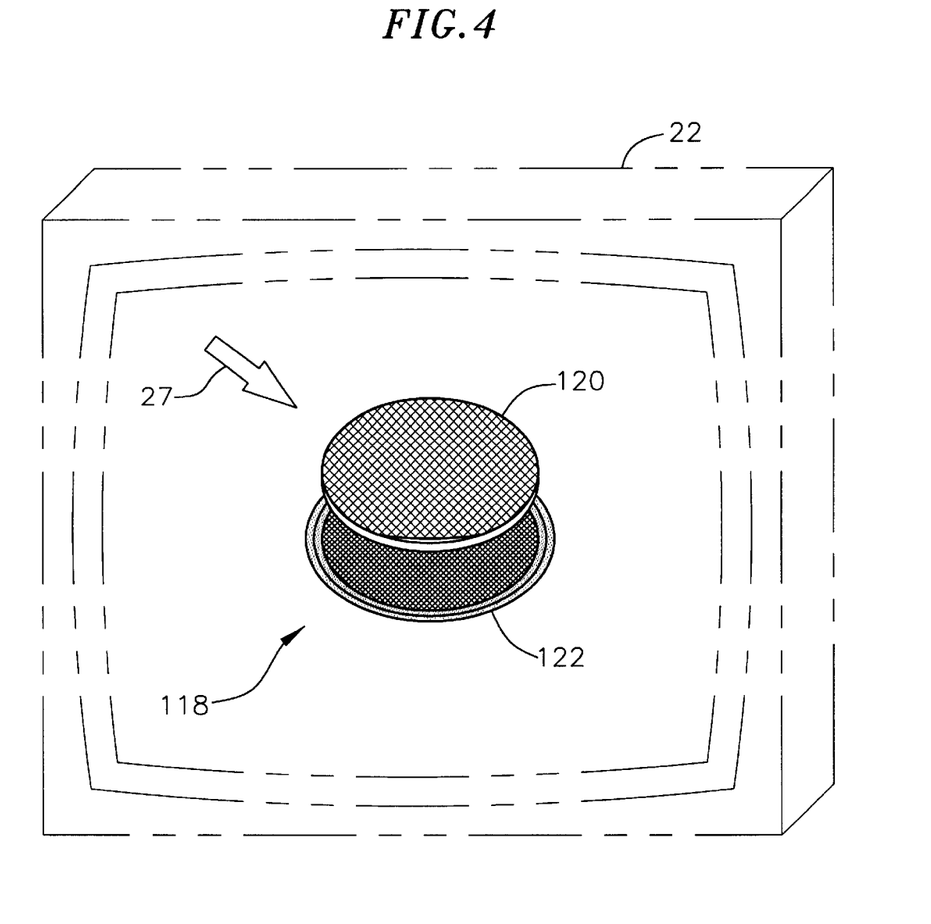
FIG. 4 is a diagram of the user input button in the active state according to an embodiment of the present invention.
Figure 5:
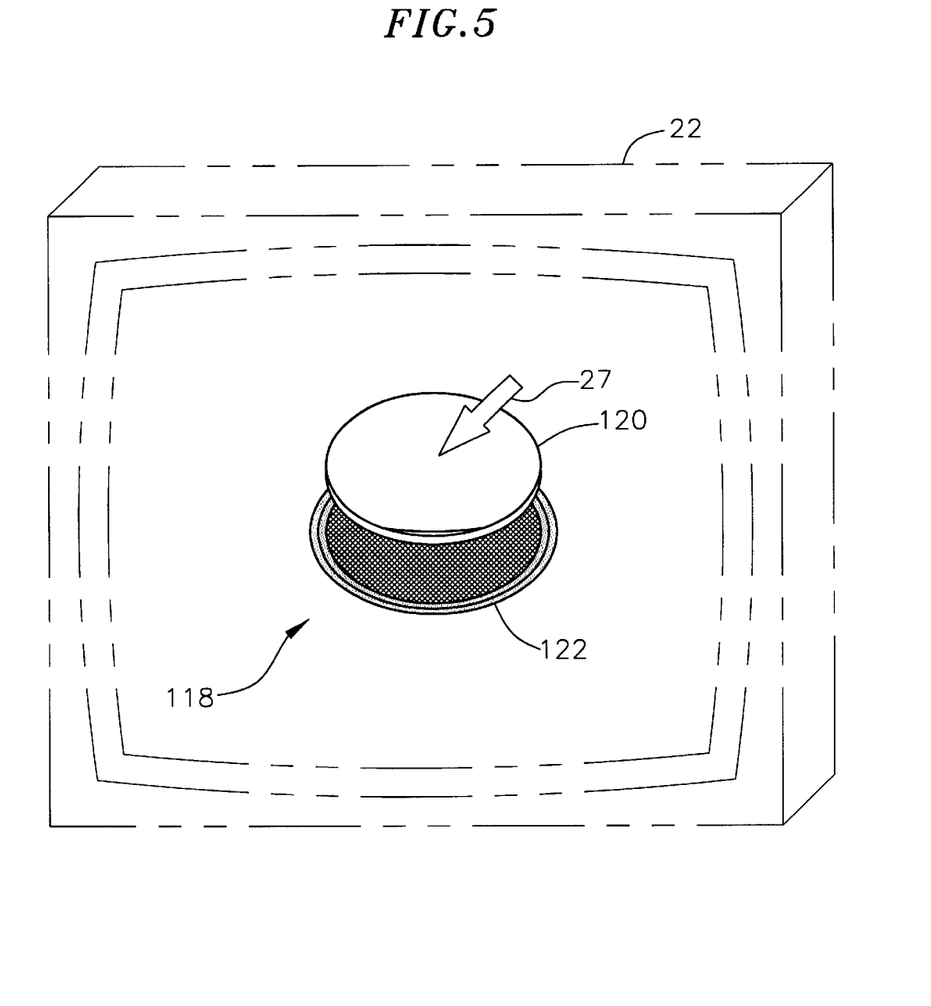
FIG. 5 is a diagram of the user input button in the entered state according to an embodiment of the present invention.
Figure 6:
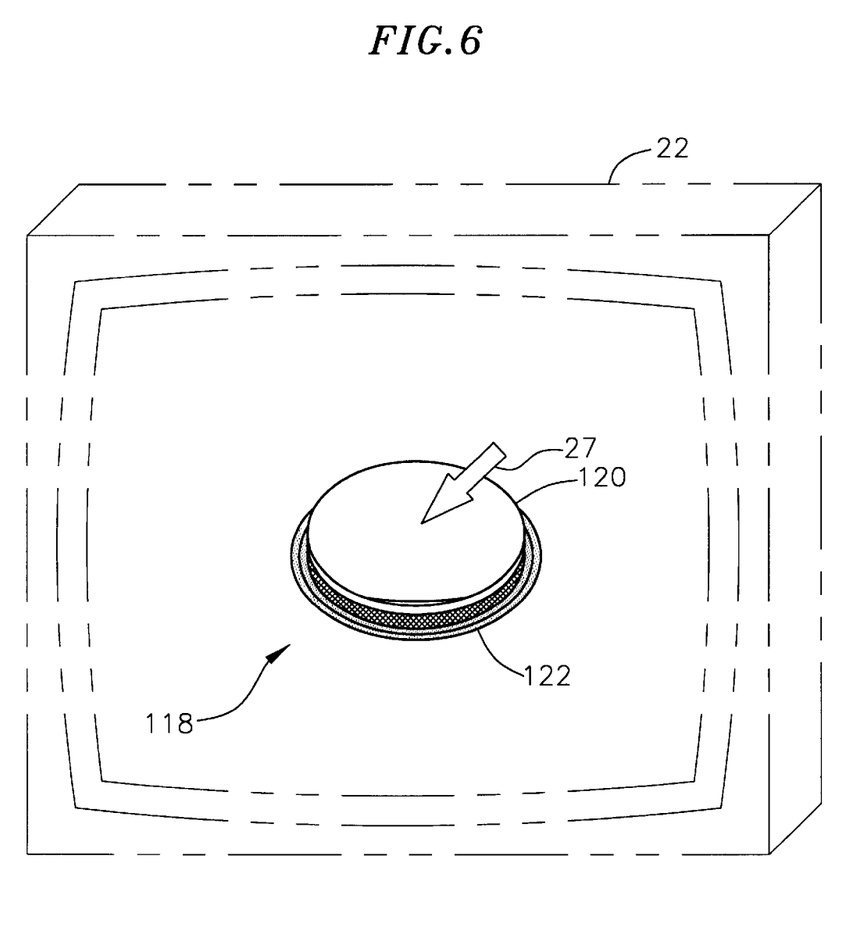
FIG. 6 is a diagram of the user input button in the pressed state according to an embodiment of the present invention.

The following figures better illustrate the appearance of the user input button during application program processing. FIG. 4 is a diagram of the user input button in the active state. For example purposes, the user input button 118 is shown in an enlarged form on a monitor 22. The first oval 120 is displayed over and partially obscures the second oval 122 to create the simulated three dimensional mechanical push button appearance. FIG. 5 is a diagram of the user input button in the entered state, caused by the cursor 27 being placed within the confines of the button. The first oval 120 is now shown in a lighter (i.e., "highlighted") color. FIG. 6 is a diagram of the user input button in the pressed state. As seen here, the position of the first oval 120 changes to obscure more of the second oval 122, thus creating the illusion of a pushed button.

Figure 7:
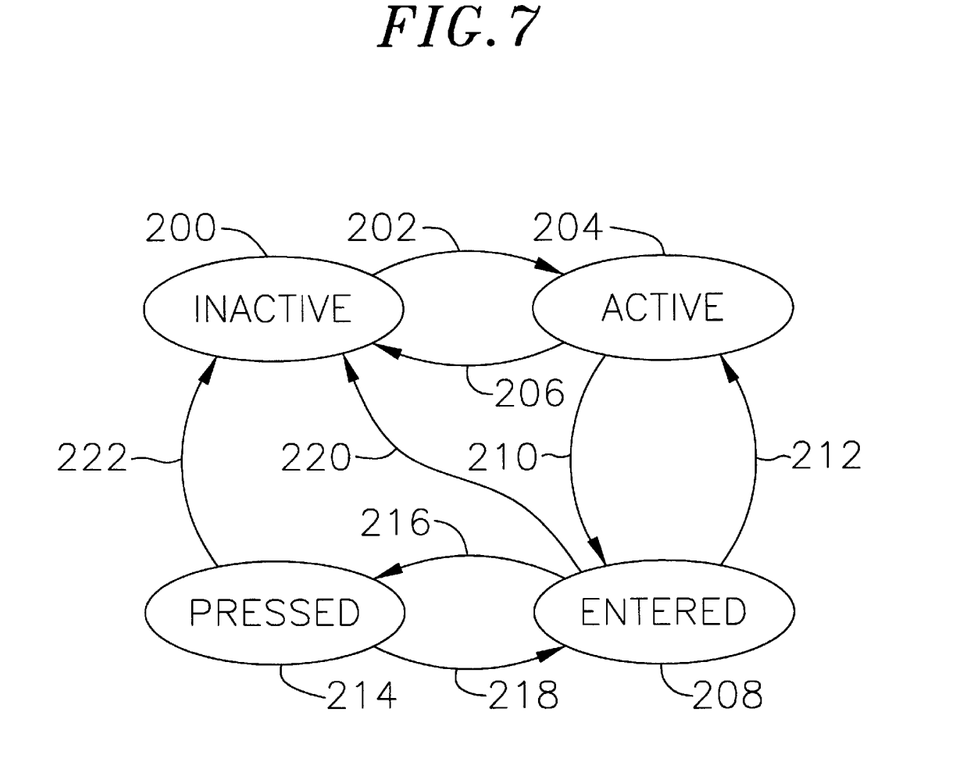
FIG. 7 is a state transition diagram of the states for the three dimensional user input button of the present invention.

FIG. 7 is a state transition diagram of the states for the three dimensional user input button of the present invention. Initially, the button is in the inactive state 200. It is transitioned over arrow 202 to the active state 204 by the application program depending on the currently available functions of the program. The appearance of the active state is shown in FIG. 4. Once in the active state 204, the user input button can be transitioned back to the inactive state 200 over arrow 206 if the program function represented by the user input button is no longer available for use by the user. When the user positions the cursor over the user input button, the state is changed to the entered state 208 via arrow 210. The user input button is then shown in a highlighted manner. The appearance of the entered state is shown in FIG. 5. If the user moves the cursor without depressing the mouse buttons, the state is changed back to the active state 204 via arrow 212. Once highlighted in the entered state 208, if the user depresses a mouse button to effect the depression of the user input button, then the pressed state 214 is entered via arrow 216. The appearance of the pressed state is shown in FIG. 6. If the user depresses the mouse button again while the cursor is positioned over the user input button, then the state transitions back to the entered state 208 via arrow 218. If processing in the application program causes the user input button to be unavailable while in the entered or pressed states, the state is transitioned to the inactive state 200 via arrows 220 and 222, respectively.

Although this invention has been described in certain specific embodiments, many additional modifications and variations would be apparent to those skilled in the art. It is therefore to be understood that this invention may be practiced otherwise than is specifically described. Thus, the present embodiments of the invention should be considered in all respects as illustrative and not restricted, the scope of the invention to be indicated by the appended claims rather than the foregoing description. The invention has been described in its presently contemplated best mode, and it is clear that it is susceptible to various modifications, modes of operation and embodiments, all within the ability and skill of those skilled in the art and without the exercise of further inventive activity. Accordingly, what is intended to be protected by Letters Patent is set forth in the appended claims.

What is claimed is:

1. An apparatus for simulating push button operation on the screen of a display device comprising:

first means for displaying on the display a first oval and a second oval spaced below the first oval a first predetermined distance to simulate an undepressed three dimensional mechanical push button;

an input device for selecting the simulated push button; and second means responsive to the input device for displaying on the display the first oval and the second oval spaced below the first oval a second predetermined distance shorter than the first distance to simulate a depressed three dimensional mechanical push button when a user input is received from the input device.

2. The apparatus of claim 1, further comprising a third means responsive to the input device for highlighting the simulated push button without changing the first distance.

3. The apparatus of claim 1, further comprising a fourth means responsive to the input device for highlighting the simulated push button without changing the second distance.

4. The apparatus of claim 1, further comprising a digital computer programmed to execute a function responsive to the second means.

5. The apparatus of claim 4, further comprising fifth means for displaying on the screen in changed appearance the first oval and the second oval spaced below the first oval the first predetermined distance to simulate an undepressed three dimensional mechanical push button in an inactive mode.

6. The apparatus of claim 1, in which a function designating symbol is displayed in the first oval.

7. The apparatus of claim 6, in which the first oval is a solid color.

8. The apparatus of claim 7, in which the second oval is a solid color.

9. A computer-implemented method of displaying a simulated three dimensional mechanical push button on a display comprising the steps of:

displaying on the display a first oval and a second oval spaced below the first oval a first predetermined distance to simulate an undepressed three dimensional mechanical push button;

selecting the simulated push button; and displaying on the display the first oval and the second oval spaced below the first oval a second predetermined distance shorter than the first distance to simulate a depressed three dimensional mechanical push button when a user input is received from the input device.

10. The computer-implemented method of claim 9, further comprising the step of highlighting the simulated push button without changing the first distance.

11. The computer-implemented method of claim 9, further comprising the step of highlighting the simulated push button without changing the second distance.

12. The computer-implemented method of claim 9, further comprising the step of programming a digital computer to execute a function associated with the simulated push button when a user input is received from the input device.

13. The computer-implemented method of claim 9, further comprising the step of displaying on the display in changed appearance the first oval and the second oval spaced below the first oval the first predetermined distance to simulate an undepressed three dimensional mechanical push button in an inactive mode.

14. The computer-implemented method of claim 9, further comprising the step of displaying a function designating symbol in the first oval.

* * * * *